United States Patent [19]
Faust et al.

[11] Patent Number: 6,019,420
[45] Date of Patent: Feb. 1, 2000

[54] VEHICLE SEAT

[75] Inventors: Eberhard Faust; Karl Pfahler, both of Stuttgart; Lothar Renner, Nufringen, all of Germany

[73] Assignee: DaimlerChrysler AG, Germany

[21] Appl. No.: 09/244,113

[22] Filed: Feb. 4, 1999

[30] Foreign Application Priority Data

Feb. 4, 1998 [DE] Germany .......................... 198 04 284

[51] Int. Cl.⁷ .................................................. A47C 7/72
[52] U.S. Cl. ................................ 297/180.14; 297/180.12
[58] Field of Search .......................... 297/180.1, 180.12, 297/180.13, 180.14, 452.44, 452.49

[56] References Cited

U.S. PATENT DOCUMENTS

| | | |
|---|---|---|
| 4,865,379 | 9/1989 | Aoki et al. . |
| 5,002,335 | 3/1991 | Bengtsson . |
| 5,002,336 | 3/1991 | Feher . |
| 5,597,200 | 1/1997 | Gregory et al. . |
| 5,902,014 | 5/1999 | Dinkel et al. . |

FOREIGN PATENT DOCUMENTS

| | | |
|---|---|---|
| 3609095 | 10/1986 | Germany . |
| 3903303 | 8/1990 | Germany ........................... 297/180.14 |
| 19628698C1 | 10/1997 | Germany . |
| 85/01482 | 5/1985 | WIPO ............................... 297/180.12 |

*Primary Examiner*—Milton Nelson, Jr.
*Attorney, Agent, or Firm*—Evenson, McKeown, Edwards & Lenahan, P.L.L.C.

[57] ABSTRACT

A vehicle seat has a cushion integrated in a seat part and/or a backrest, which cushion has a ventilation layer, through which air can flow, and an air-permeable cushion cover spanning the cushion surface. The seat also has at least one ventilator arranged below the cushion for blowing air into the ventilation layer. In order to provide a ventilated vehicle seat construction at reasonable cost for vehicles of the medium to lower price range, the ventilation layer is constructed as an air-permeable cushion support which rests on a cushion carrier only by way of intermediate placement of an air-impermeable pressure distribution layer. The pressure distribution layer has at least one inflow opening for the ventilation air on which the ventilator is arranged below the air distribution layer.

20 Claims, 2 Drawing Sheets

VEHICLE SEAT

This application claims the priority of German patent application No. 198 04 284.1, filed Feb. 4, 1998, the disclosure of which is expressly incorporated by reference herein.

BACKGROUND AND SUMMARY OF THE INVENTION

The present invention relates to a vehicle seat having a cushion integrated in a seat part and/or a backrest and accommodated by a cushion carrier. The cushion has a ventilation layer, through which air can flow, and an air-permeable cushion cover spanning the cushion surface facing a sitting person. At least one ventilator is arranged on the bottom or backside of the cushion, facing away from the cushion surface, for blowing air into the ventilation layer.

Ventilated vehicle seats of this type are used for improving sitting comfort when a parked vehicle, which has been overheated by extended sun radiation, is entered as well as for longer driving periods.

In a vehicle seat of this type, such as that known from German Patent Document DE 196 28 698 C1, the cushion layer or so-called "ventilation layer", which consists of a wide-meshed spaced knit and through which air can flow, covers the whole surface of a cushion support made of rubberized hair or foam which rests on a cushion carrier, such as a spring core. The cushion layer is covered on its top or front side facing away from the cushion support by an air-permeable pressure distribution layer made of a spaced knit or a nonwoven or open-pore foam. A cushion cover spans the pressure distribution layer, and a cover stuffing is worked in between the cushion cover and the pressure distribution layer. A plurality of electrically driven miniature fans or miniature ventilators, which are inserted into the air ducts worked into the cushion support, are provided for ventilating the ventilation layer. These air ducts are arranged so as to be distributed over the cushion surface.

In a limited area above mouths of the air duct, an air-impermeable intermediate layer, such as a foil, is in each case arranged on the top side of the ventilation layer facing away from the air duct mouth. Consequently, the air blown by the air duct into the ventilation layer is deflected, flows through the ventilation layer, and does not immediately exit through the pressure distribution layer and the cushion cover. The miniature fans take in air from the area of the occupant space situated below the seat part and blow this air into the ventilation layer. In the ventilation layer, the air can spread in all directions. When the seat is unoccupied, the air flows through the pressure distribution layer and the cushion cover into the air space above the seat surface, causing a rapid cooling of the seat surface which is heated, for example, by sun radiation. When the seat is occupied, the air flows along in the ventilation layer and exits again at the open ends of the ventilation layer. In this process, the air generates a temperature and air humidity gradient and discharges the air moistened by the sitting person.

With respect to its manufacturing, such a cushion design is very expensive to manufacture and, therefore, is used only in connection with vehicle seats for vehicles in an upper price class.

It is an object of the invention to provide seat ventilation, in a vehicle seat of the initially mentioned type, at reasonable cost so that the conditioned sitting comfort can be improved in vehicle seats for vehicles of medium and low price classes.

In a vehicle seat of the type mentioned above, this object is achieved according to the invention by forming the ventilation layer as an air-permeable cushion support which rests on the cushion carrier with intermediate placement of an air-impermeable pressure distribution layer. The pressure distribution layer has at least one inflow opening for the ventilation air. The ventilator is arranged on this inflow opening below the pressure distribution layer.

The vehicle seat according to the invention has an advantage in that the cushion support itself is constructed as a cushion layer (ventilation layer) through which air can flow and which, on its supporting side on the cushion carrier, is covered by an air-impermeable pressure distribution layer. As a result, a significantly simpler cushion construction is achieved. The simpler cushion construction, and the reduced number of ventilators required for ventilation (one for the cushion in the seat part and one for the cushion in the backrest), clearly reduce the manufacturing costs. The retained arrangement of at least one ventilator below the cushion, specifically below the pressure distribution layer, and the resulting removal of air from the space below the seat, despite the small ventilator dimensions, permit an air flow rate which is high enough that a heated cushion can be cooled to comfortable temperatures in a short time.

Advantageous embodiments of the vehicle seat according to the invention with expedient developments, and further developments of the invention, are clear from the description which follows.

BRIEF DESCRIPTION OF THE DRAWINGS

The invention will be now described in detail by referring to embodiments illustrated in the drawings.

DESCRIPTION OF THE PREFERRED EMBODIMENTS

Figure 1:
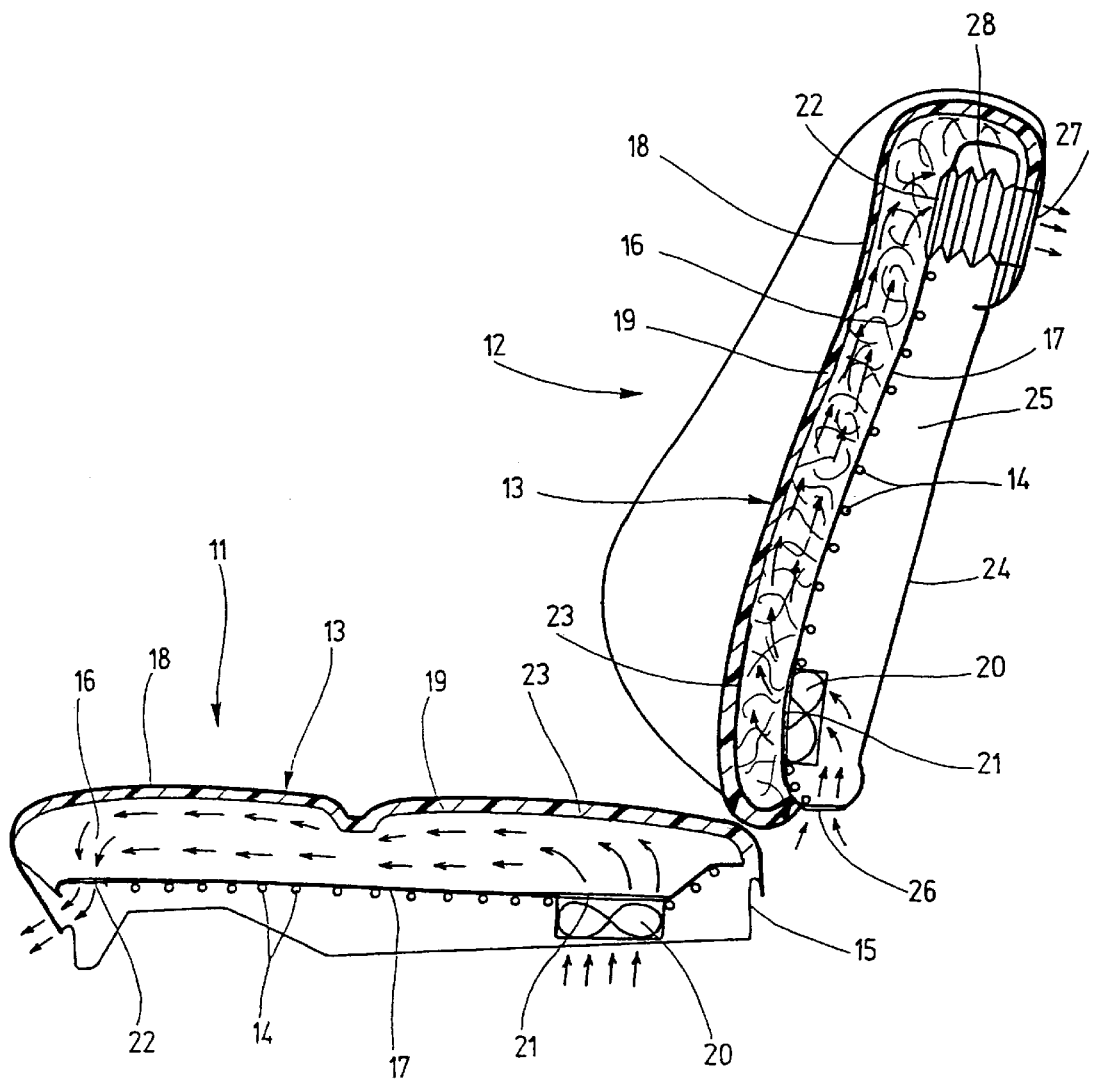
FIGS. 1 and 2 are respective schematic longitudinal sectional views of vehicle seats according to two embodiments.

The vehicle seat outlined in FIG. 1 in a schematic longitudinal sectional view, in a known manner, has a seat part 11 adjustably held on the vehicle floor and a backrest 12 which, for adjusting the inclination, is connected with the seat part 11 by a swivel locking. The seat part 11 and the backrest 12 each have a cushion 13 which is fastened on a cushion carrier 14. In the embodiment of FIG. 1, the cushion carrier 14 is constructed as a spring core made of spring wire which is in each case fastened in a frame. In the seat part 11, the frame is indicated by the reference number 15. For reasons of clarity, the frame in the backrest 12 is omitted. The cushion 13 is constructed the same for the seat part 11 and the backrest 12 and comprises an air-permeable cushion support 16 made of a coarsely structured nonwoven material, such as rubberized hair, or of a spaced knit, and an air-impermeable pressure distribution layer 17 made of a nonwoven or rubberized-hair material of a high density which rests directly on the cushion carrier 14 and completely covers the cushion support 16 on its underside in the seat part 11 and on its back side in the backrest 12. The top side or front side of the cushion 13, which faces away from the pressure distribution layer 17, is covered by an air-permeable cushion cover 18 made of a textile fabric, perforated leather or synthetic material, and a cover stuffing 19 made of cushion padding, nonwoven wool, an open-pore or at least partially perforated foamed material, or of a padding-foam combination is worked in between the cushion support 16 and the cushion cover 18. If an electric seat heater (not shown here in detail) is present, then its heating wires are embedded in the cover stuffing 19.

The air-permeable cushion support 16 represents a so-called ventilation layer, through which an electrically driven fan or ventilator 20 can cause air to flow. For providing an air flow path with a low flow resistance, the pressure distribution layer 17 is provided with an inflow opening 21 and an outflow opening 22 which, viewed in the longitudinal direction of the seat part 11 or of the backrest 12, are arranged at the largest possible distance from one another. The ventilator 20 is placed directly on the air inflow opening 21 below the pressure distribution layer 17 and is fastened to the latter. In the area of the air inflow opening 21, the cushion support 16 is covered on its top side facing away from the pressure distribution layer 17 by an air-impermeable blocking layer 23, such as a foil. At this point, therefore, the air flowing in by way of the air inflow opening 21 is deflected and flows in the longitudinal direction through the cushion support 16 and cannot exit directly by way of the air-permeable cushion cover 18. As not shown here in detail, the blocking layer 23 can additionally continue beyond the direct area of the air inlet opening 21 and can be at least partially perforated so that different cushion areas are ventilated at different intensities; this is not shown here in detail.

In the embodiment of FIG. 1, the air inflow opening 21 in the seat part 11 is arranged in the rear close to the backrest 12 and the air outflow opening 22 is arranged in the front on the seat part 11 so that the air taken in by the ventilator 20 from the vehicle interior below the seat part 11 flows through the cushion support 16 from the rear to the front. The air inflow opening 21 is provided in the lower area of the backrest 12 and the air outflow opening 22 is provided in the upper area of the backrest 12 so that air flow through the cushion support 16 takes place upwards from below. As is generally customary, and also in this case, the backrest 12 is covered on its backside facing away from the cushion cover 18 with a backrest covering 24. A hollow space 25 remains between the cushion carrier 14 and the rearward backrest covering 24. In this case, the cushion cover 18 is pulled over the upper edge of the backrest 12 into the upper part of the backside of the backrest 12 and is held in a tensioned manner there by the backrest covering 24 which, in turn, is fastened to the underside of the backrest 12 on the backrest frame. On the underside of the backrest 12, an air inlet opening 26 is constructed in the backrest covering 24, and, in the upper area of the backrest 12, an air outlet opening 27 is worked into the area of the cushion cover 18 extending on the backside of the backrest 12. The air outlet opening 27 is connected, by way of an air duct 28 penetrating the hollow space 25, to the air outflow opening 22 in the pressure distribution layer 17. In the embodiment of FIG. 1, the air duct 28 is constructed as a flexible bellows. The ventilator 20, which is still assigned to the air inflow opening 21, is accommodated in the hollow space 25 and takes in air by way of the air inlet opening 26 on the bottom side of the backrest 12.

When the vehicle seat is occupied, the air which is taken in flows through the cushion support 16 upwards from below and, by way of the air outflow opening 22, the air duct 28 and the air outlet opening 27 at the top side of the backrest is discharged again into the vehicle interior. Within the cushion support 16, the air sweeps along parallel to the front side of the backrest under the cushion cover 18, as well as on the seat surface of the seat part 11, and, in the process, generates an air humidity gradient so that air moistened by the seat user is discharged. When the seat is unoccupied, the air flowing in the cushion support 16 also flows through the cushion cover 18 into the air space in front of the backrest or above the seat part surface and causes rapid cooling of the vehicle seat heated, for example, by sun radiation. In order to utilize this effect, it is useful to couple the switch-on operation of the two ventilators 20 in the seat part 11 and in the backrest 12 with unlocking of the vehicle doors by a remote-controlled locking system so that the cooling of the vehicle seat starts before the vehicle is entered. Since the air is taken in from the area below the vehicle seat, the cooling effect is intensified because, in a vehicle which is heated when parked, the temperature is lowest in the area below the vehicle seat.

In comparison to the vehicle seat according to FIG. 1 described above, the vehicle seat outlined in FIG. 2 is modified to such an extent that the air flow in the cushion support 16 of the cushion 13 in the seat part 11 is guided from the front toward the rear and, in the cushion support 16 of the cushion 13 in the backrest, is guided downward from above. For this purpose, the air inflow opening 21 in the pressure distribution layer 17 is arranged close to the forward end of the seat part 11 and the air outflow opening 22 is arranged close to the rearward end of the seat part 11 in the pressure distribution layer 17. In the forward area of the seat part 11, the cushion 13 is supported by way of an elastic foam body 29 on a so-called anti-submarining wedge 30 constructed in the seat part frame 15 and does not rest on springs. The elastic foam body 29 provides the required spring deflection performance of the seat in the event of a strong braking operation or in the event of a crash and simultaneously forms an air duct 31 which connects the air inflow opening 21 in the pressure distribution layer 17 with the ventilator 20 fastened on the underside of the anti-submarining wedge 30. If the cushion support 16 is not supported on the anti-submarining wedge 30 by the foam body 29 and the spring core has a continuous construction as in FIG. 1, then the air inflow opening 21 is connected by way of bellows to the ventilator fastened from below to the anti-submarining wedge 30.

In order to supply the cushion support 16 of the backrest 12 with cool air from the lower area of the occupant compartment, the air inlet opening 26 is again constructed in the lower area of the backrest 12 in the backrest covering 24; specifically, this time, the air inlet opening is on the backside of the backrest 12 and not on its underside, and the hollow space 25 between the backrest covering 24 and the cushion 13 is used as an air guiding duct in which the air taken in by way of the air inlet opening 26 flows upwards and enters, by way of the air inlet opening 26, into the air-permeable cushion support 16. The air intake again takes place by way of the ventilator 20 which is arranged in the same manner in the air inflow opening 21 and is fastened to the air-impermeable pressure distribution layer 16. The air outflow opening 22 is placed on the underside of the backrest 12.

Figure 2:
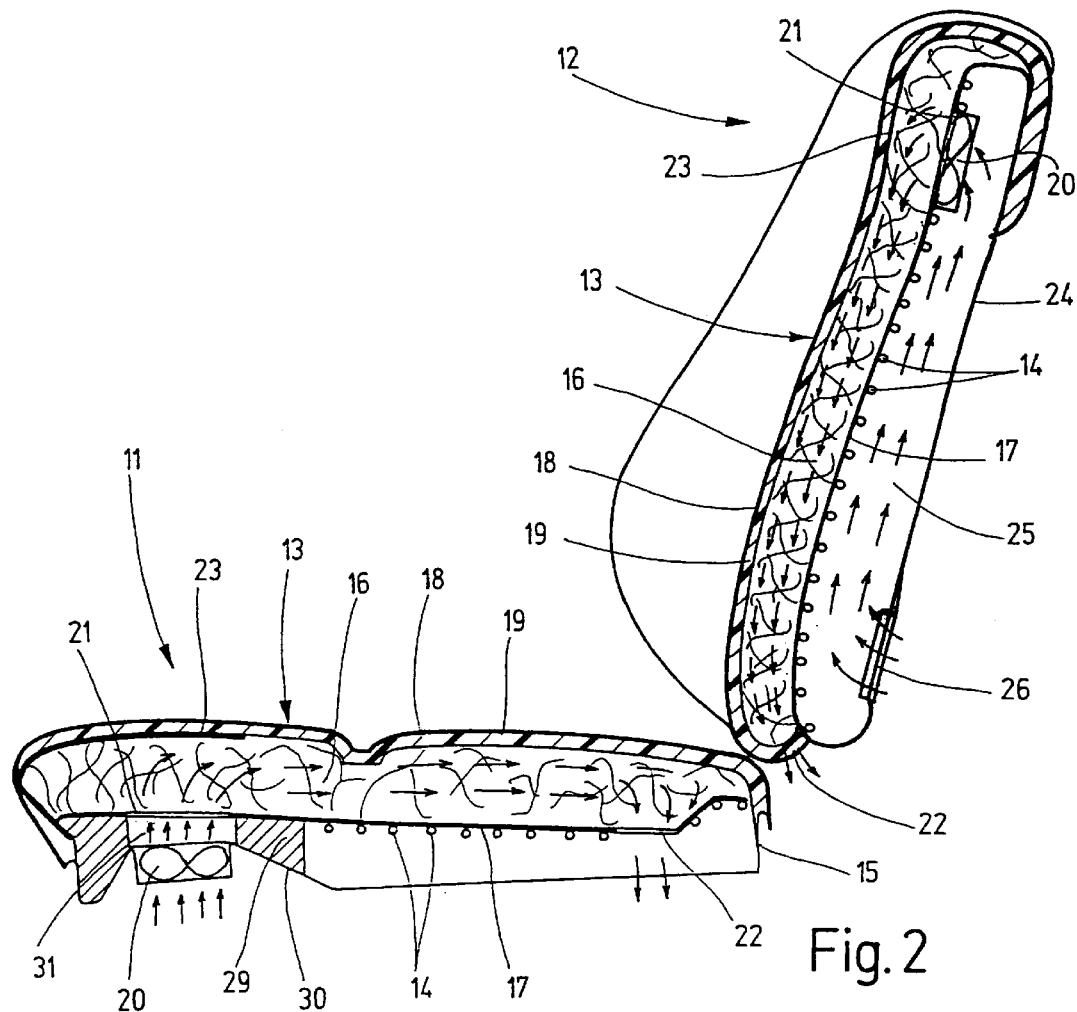
Figure 3:
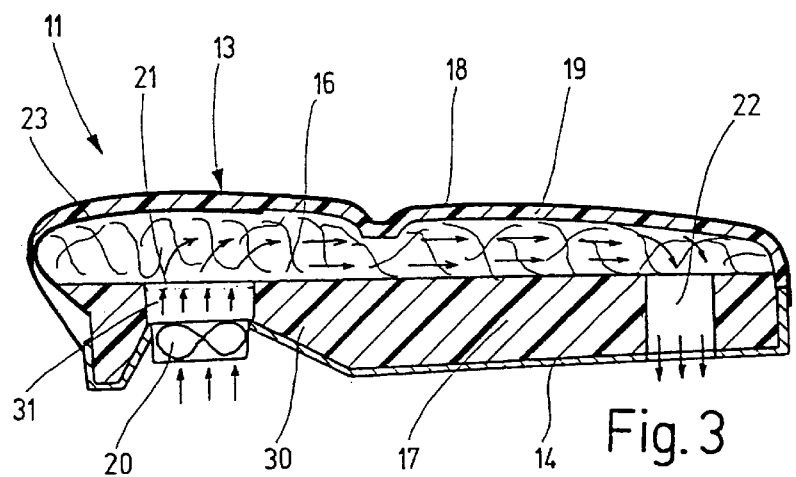
FIG. 3 is a schematic longitudinal sectional view of a modified seat part of the vehicle seat shown in FIG. 1 or FIG. 2.

FIG. 3 illustrates a seat part 11 which is modified with respect to FIG. 2. Here, the cushion carrier 14 is constructed as a seat bucket, in which an anti-submarining wedge 30 rather than a spring core is also constructed. The air-impermeable pressure distribution layer 17 here is not constructed as a thin layer made of a nonwoven or a rubberized-hair material of a high density; instead, the air-impermeable pressure distribution layer is constructed as a dense foam cushion which is supported on the seat bucket and contains the air inflow opening 21 and the air outflow opening 22 as ducts, each of which penetrates the foam cushion. As in the seat part shown in FIG. 2, the air inflow opening 21 is arranged close to the forward end of the seat part 11, and the air outflow opening 22 is arranged close to the rearward end of the seat part 11. Therefore, the air flow generated in the cushion support 16 by the ventilator 20, which is fastened on the underside of the anti-submarining wedge 30, is guided from the front to the rear. A similar construction of the backrest in FIG. 2 with such a foam cushion is conceivable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle seat comprising:
   a cushion integrated in at least one of a seat part and a backrest,
   a cushion carrier by which said cushion is accommodated, said cushion having a ventilation layer through which air can flow,
   an air-permeable cushion cover spanning a cushion surface for a sitting person, and
   at least one ventilator, arranged on at least one of a bottom side or a backside of the cushion facing away from the cushion surface, which blows air into the ventilation layer,
   wherein the ventilation layer is an air-permeable cushion support which rests on the cushion carrier with an air-impermeable pressure distribution layer placed intermediate the cushion support and the cushion carrier, and wherein the pressure distribution layer has at least one air inflow opening for ventilating air on which the ventilator is arranged below the pressure distribution layer.

2. Seat according to claim 1, and further comprising an anti-submarining wedge constructed in the seat part, wherein the air flow through the air-permeable cushion support of the cushion in the seat part is guided from a front to a rear of the seat part, and wherein the ventilator is fastened below the anti-submarining wedge constructed in the seat part and is connected by way of an elastic air duct to the air inflow opening.

3. Seat according to claim 2, and further comprising a foam body supported on the wedge, wherein, in an area of the anti-submarining wedge, the pressure distribution layer rests on the foam body supported on the wedge and the air duct is constructed in the foam body.

4. Seat according to claim 1, wherein the cushion carrier is a spring core clamped into a frame, and the air-impermeable pressure distribution layer is one of a nonwoven and rubberized-hair material of a high density.

5. Seat according to claim 1, wherein the cushion carrier forms a bucket, and the air-impermeable pressure distribution layer is constructed as a foam cushion supported on the bucket.

6. Seat according to claim 1, and further comprising an air-impermeable blocking layer mounted in an area of the at least one air inflow opening on a top side of the air-permeable cushion support.

7. Seat according to claim 6, wherein the blocking layer extends beyond a direct area of the at least one air inflow opening and is at least partially perforated.

8. Seat according to claim 1, wherein the air flow through the air-permeable cushion support of the cushion in the seat part is guided from a rear to a front of the seat part, and the ventilator is fastened directly on an underside of the pressure distribution layer.

9. Seat according to claim 1, wherein the air-permeable cushion support is of any of a coarsely structured nonwoven material, rubberized hair and a spaced knit.

10. Seat according to claim 1, wherein the cushion cover is of any of a textile fabric or perforated leather or synthetic material.

11. Seat according to claim 1, wherein said backrest has a backside facing away from the cushion cover and is covered on said backside by a backrest covering, wherein a hollow space with an air inlet opening is constructed between the cushion and the backrest covering, and wherein the ventilator is accommodated in the hollow space.

12. Seat according to claim 11, wherein the air flow through the air-permeable cushion support is guided upwards from below, the air inlet opening is constructed on an underside of the hollow space in the backrest covering, at least one of the backrest covering and the cushion cover is pulled over an upper edge of the backrest to its backside and has an air outlet opening in the upper area of the backrest, and an air duct penetrates the hollow space and connects to an air outflow opening in the pressure distribution layer.

13. Seat according to claim 11, wherein the air flow through the air-permeable cushion support is guided downward from above, the air inlet opening is constructed in a lower area of the hollow space in the backrest covering, and an air outflow opening is arranged in the backside of the backrest in the pressure distribution layer on the underside of the backrest.

14. Seat according to claim 1, and further comprising a cover stuffing arranged between the air-permeable cushion support and the cushion cover.

15. Seat according to claim 14, wherein the cover stuffing is of any of cushion padding, nonwoven wool, an open-pore and an at least partially perforated foam material layer of a padding-foam material combination.

16. Seat according to claim 14, and further comprising an electric heater having heat conductors which are embedded in the cover stuffing.

17. Seat according to claim 1 wherein, at a largest possible longitudinal distance from the at least one air inflow opening, at least one air outflow opening is constructed in the pressure distribution layer.

18. Seat according to claim 17, wherein the cushion carrier is a spring core clamped into a frame, and the air-impermeable pressure distribution layer is of a nonwoven or rubberized-hair material of a high density.

19. Seat according to claim 17, wherein the cushion carrier forms a bucket, and the air-impermeable pressure distribution layer is constructed as a foam cushion supported on the bucket.

20. Seat according to claim 17, and further comprising an air-impermeable blocking layer mounted in an area of the at least one air inflow opening on a top side of the air-permeable cushion support.

* * * * *